(12) United States Patent
Angelides (10) Patent No.: US 9,640,971 B2
(45) Date of Patent: May 2, 2017

(54) SELF-CALIBRATING CIRCUIT INTERRUPTER

(71) Applicant: Leviton Manufacturing Co., Inc., Melville, NY (US)

(72) Inventor: Mario Angelides, Oceanside, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 310 days.

(21) Appl. No.: 14/519,261

(22) Filed: Oct. 21, 2014

(65) Prior Publication Data

US 2016/0111866 A1    Apr. 21, 2016

(51) Int. Cl.
*H02H 3/00* (2006.01)
*H02H 3/16* (2006.01)
*H02H 3/33* (2006.01)

(52) U.S. Cl.
CPC .............. *H02H 3/006* (2013.01); *H02H 3/33* (2013.01)

(58) Field of Classification Search
CPC ............. H02H 3/006; H02H 3/16; H02H 3/33
USPC .......................................................... 361/46
See application file for complete search history.

(56) References Cited

U.S. PATENT DOCUMENTS

| | | | |
|---|---|---|---|
| 5,691,869 A | * | 11/1997 | Engel ................... H02H 1/0015 361/42 |
| 7,542,252 B2 | | 6/2009 | Chan et al. |
| 8,547,126 B2 | | 10/2013 | Ostrovsky et al. |
| 2007/0091520 A1 | | 4/2007 | Angelides et al. |
| 2009/0273866 A1 | | 11/2009 | Chan et al. |
| 2014/0197856 A1 | | 7/2014 | Ostrovsky et al. |
| 2014/0211345 A1 | * | 7/2014 | Thompson .......... B60L 11/1816 361/42 |

* cited by examiner

*Primary Examiner* — Thienvu Tran
*Assistant Examiner* — Kevin J Comber (57) ABSTRACT

A circuit interrupter includes phase and neutral conductive paths between a line side and a load side of the circuit interrupter. Differential and ground/neutral transformers are coupled to the phase and neutral paths. A circuit interrupter chip is coupled to the phase and neutral conductive paths, and to respective fault inputs from the transformers. A calibration circuit including a calibration resistor is coupled to a circuit interrupter controller. An interrupter circuit is configured to open the phase and neutral paths when a predetermined ground fault current condition is sensed. The circuit interrupter controller is configured to perform a self-calibration function to adjust a ground fault current trip-time response to maintain the ground fault current trip-time response within a predetermined range. Methods for using the self-calibrating circuit interrupter are also disclosed.

19 Claims, 4 Drawing Sheets

SELF-CALIBRATING CIRCUIT INTERRUPTER

FIELD OF THE DISCLOSURE

The present disclosure relates generally to circuit interrupting devices, and more particularly to a ground fault circuit interrupter (GFCI) having self-calibrating features.

BACKGROUND OF THE DISCLOSURE

Circuit interrupters, such as Ground Fault Circuit Interrupters (GFCIs) are employed in a variety of environments to interrupt power provided to various loads, such as household appliances, electrical products and branch circuits. Typically, circuit interrupters use a trip mechanism to mechanically break an electrical connection between an input and one or more output conductors, when, for example, a ground fault is sensed by a sensing circuit incorporated within the circuit interrupter.

The sensing circuit can incorporate a high turn ratio differential transformer connected to detect the difference of current in the neutral and phase wires of an electrical distribution system. The secondary coil of the differential transformer can be connected to an input of a high gain operational amplifier (OA) on a chip having an integrated circuit for detecting ground faults. The high gain OA provides an amplified signal which is proportional to the differential of the neutral and phase current. This amplified signal is used to charge a capacitor. Under a ground fault condition (where a GFCI is used), the amplified signal will quickly charge the capacitor in excess of a threshold value, whereupon a relay trigger is energized, causing a set of contacts to open to disconnect the load from the line.

As noted, circuit interrupters are designed to trip (e.g. interrupt current) when a fault is present. It can be advantageous to interrupt a larger fault current sooner since a larger ground fault current presents a greater shock risk to personnel. Underwriters Laboratories (UL) Standard 943 requires, for a Class "A" GFCI, that the GFCI must trip when a ground fault is sensed within a certain period of time, depending on the magnitude of the ground fault current (e.g. trip-time response). The trip-time response is dictated by the equation:

$T=(20/I)^{1.43}$ where "T" is time measured in seconds, and "I" is current measured in milliamps (mA).

For example, with a ground fault of 5 mA, the GFCI would be required to trip within about 7¼ seconds.

Circuit interrupters can be calibrated to trip within a time inversely proportional to the magnitude of the fault current in accordance with the above equation. Once calibrated, however, the trip-time response can be subject to one or more shifts caused by a variety of environmental and operational factors. Examples of such environmental factors include temperature fluctuations, while examples of operational factors include input voltage and load. As will be appreciated, shifts of the trip-time response are undesirable because they can cause the circuit interrupter to have a trip-time response that is either slower or faster than a predetermined trip-time response. For the example above, a trip-time response shift may result in a 5 mA ground fault not tripping the circuit interrupter until after the about 7¼ second period has elapsed.

In view of this, it would be desirable to provide a self-calibrating circuit interrupter that automatically and/or periodically adjusts the trip-time response to counteract shifts caused by input voltage, load, temperature and/or other factors.

SUMMARY OF THE DISCLOSURE

A circuit interrupter is disclosed, including a phase conductive path and a neutral conductive path disposed between a line side and a load side of the circuit interrupter. A differential transformer may be coupled to said phase conductive path and said neutral conductive path. A ground/neutral transformer may be coupled to the phase conductive path and the neutral conductive path. A circuit interrupter chip may be electrically coupled to respective fault inputs from the differential transformer and the ground/neutral transformer. A controller can be electrically coupled to the circuit interrupter chip, the controller further including an electrical sensing line disposed through the differential transformer and the ground/neutral transformer, the controller coupled to a variable resistor, where a resistance of the variable resistor is controllable by the controller. An interrupter circuit can be coupled to the controller for opening at least one the phase conductive path and the neutral conductive path when a predetermined ground fault current condition is sensed by the circuit interrupter chip. The controller can be programmed to adjust a resistance of the variable resistor based on a sensed value of the fault current from the electrical sensing line, to thereby adjust a fault current interrupter trip-time response to maintain the fault current trip-time response within a predetermined range.

A circuit interrupter is disclosed, including a phase conductive path and a neutral conductive path disposed between a line side and a load side of the circuit interrupter. A differential transformer and a ground/neutral transformer may be provided, and may each be coupled to the phase conductive path and the neutral conductive path. A circuit interrupter chip may be electrically coupled to respective fault inputs from the differential transformer and the ground/neutral transformer. The circuit interrupter chip may also be electrically coupled to an electrical sensing line disposed through the differential transformer and the ground/neutral transformer. The circuit interrupter chip may be programmed to adjust a fault current interrupter trip-time response based on a sensed value of the fault current from the electrical sensing line to maintain the fault current trip-time response within a predetermined range.

A method is disclosed for self-calibration of a circuit interrupter, including: determining a voltage between a phase conductive path and a neutral conductive path, the phase conductive path and the neutral conductive path being disposed between a line side and a load side of the circuit interrupter; obtaining a fault input from a differential transformer coupled to the phase conductive path and said neutral conductive path; obtaining a fault input from a ground/neutral transformer coupled to the phase conductive path and the neutral conductive path; determining a resistance of a calibration resistor; and adjusting a trip-time response of the circuit interrupter based on the determined voltage, the respective fault inputs, and the resistance.

BRIEF DESCRIPTION OF THE DRAWINGS

By way of example, a specific embodiment of the disclosed device will now be described, with reference to the accompanying drawings wherein like elements are designated by identical reference numerals throughout the several views, and in which.

DETAILED DESCRIPTION

The disclosure includes an arrangement for preventing environmental and operational factors from affecting the circuit interrupter calibration and the trip-time response. As will be appreciated, the disclosed arrangement can be used in any circuit interrupter, or other suitable device, to enhance the accuracy of trip-time response, in addition to, or in place of, calibration at the manufacturing facility. When the disclosed arrangement is used in place of the calibration at the manufacturing facility, this may save manufacturing costs.

As previously discussed, however, shifts in the trip-time response caused by input voltage, load and temperature changes can occur after calibration, and these shifts can result in the circuit interrupter tripping outside the required trip-time response. For example, the circuit interrupter may not trip quickly enough at any given magnitude of fault current. Alternatively, the circuit interrupter may trip too quickly at any given magnitude of fault current, resulting in false or nuisance tripping.

As will be described in greater detail later, the disclosure describes an arrangement employing voltage, or other electrical signal, detection to measure fault inputs from the differential transformer and test circuit of the circuit interrupter and to provide those fault input values to the circuit interrupter controller, which can then set trip-time response accordingly (which in turn causes an SCR to fire). By doing this, a calibration/recalibration of the trip-time response can be obtained, thereby minimizing or eliminating operational and/or environmental effects on the trip level. In some embodiments the circuit interrupter can be automatically self-calibrated on a periodic basis. In other embodiments the circuit interrupter can be self-calibrated each time the GFCI reset button is pressed or at any other suitable time.

Using the above-noted voltage detection, the fault inputs (i.e., the signal from the differential transformer) and calibration circuit, a calibration resistor can be adjusted so the relay trigger (i.e. SCR) or microcontroller fault sensitivity can be set at a value appropriate to achieve triggering of the circuit interrupter within a desired range. Alternatively, the analog to digital (A/D) inputs of the circuit interrupter microcontroller can be used to measure the fault inputs (i.e., the signal from the differential transformer) of the known or adjusted calibration circuit, and can change the relay trigger (i.e. SCR) appropriately.

Although the disclosure will proceed with respect to a GFCI, it will be appreciated that the disclosed circuit interrupter is not limited to GFCI applications, and, the disclosed self-calibrating circuit interrupter can be employed in any of a variety of applications, but may find particularly advantageous use in applications in which operational and environmental conditions vary widely and/or quickly. For example the disclosed self-calibrating circuit interrupter may find use in factories, commercial installations, industrial establishments, and the like. Other examples include, but are not limited to, high current fault sensing applications such as in vending machines, electric vehicle charging, outdoor applications such as temporary power in-line circuit interrupter and other original equipment manufacturer (OEM) applications where the circuit interrupter is installed in a less than ideal location such as a generator enclosure.

The disclosed self-calibrating circuit interrupter may allow for a wider voltage range during operation while calibrating the trip level beyond the 102V-132V alternating current (AC) range (i.e., the extremes of trip level testing required under UL Standard 943). This can be important because if the voltage goes beyond the standard operating voltage, such as in dimmable lighting solutions that require GFCI protection, the GFCI trip level and response time should maintain the UL class A GFCI rating to ensure the safety of the application. The disclosed self-calibrating GFCI can also allow for consistent performance and trip-time response when the GFCI is subjected to any of a variety of load conditions, including high load conditions, a non-limiting example of which may include loading conditions of 80 A or higher.

Figure 1:
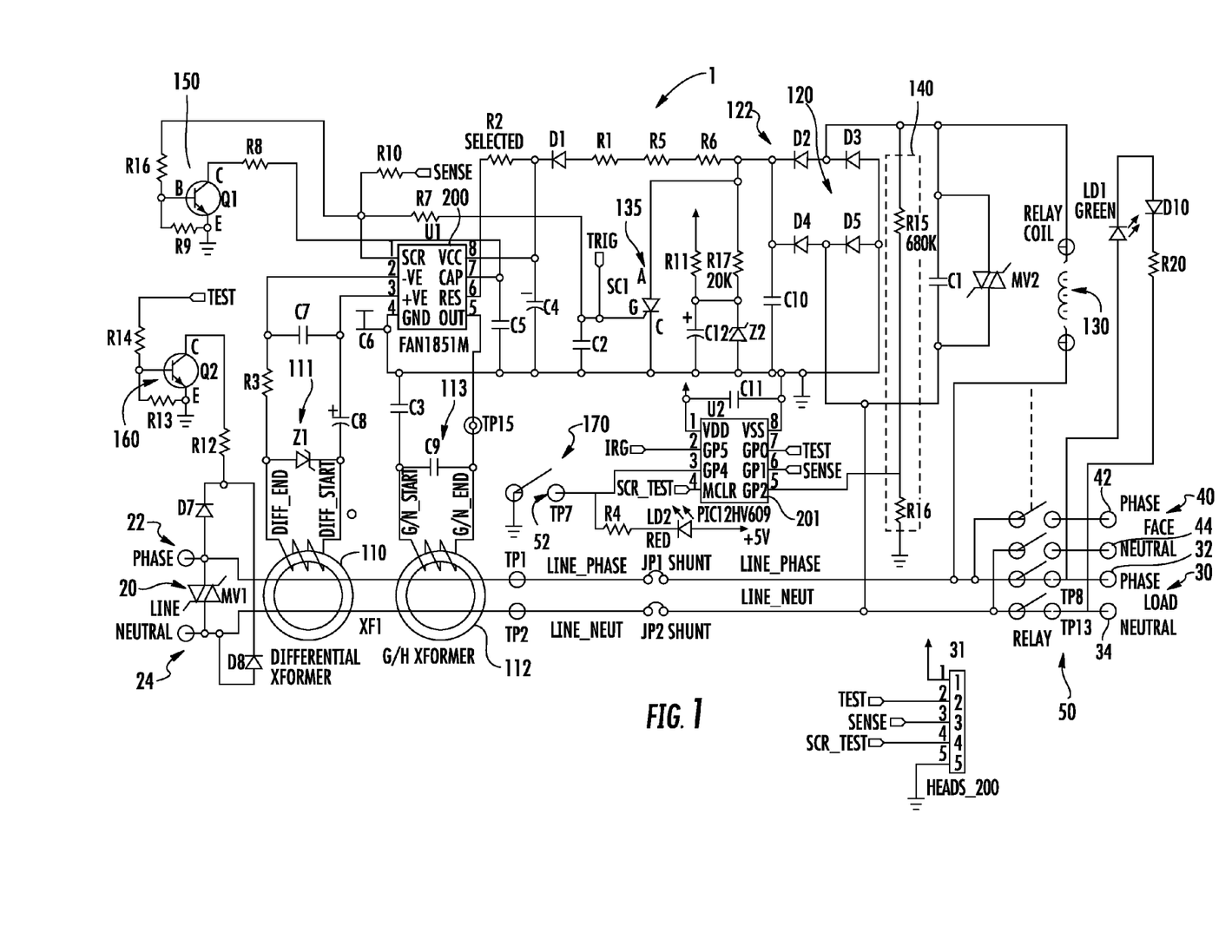
FIG. 1 is a schematic diagram of an exemplary circuit interrupter according to an embodiment of the disclosure.
Figure 2:
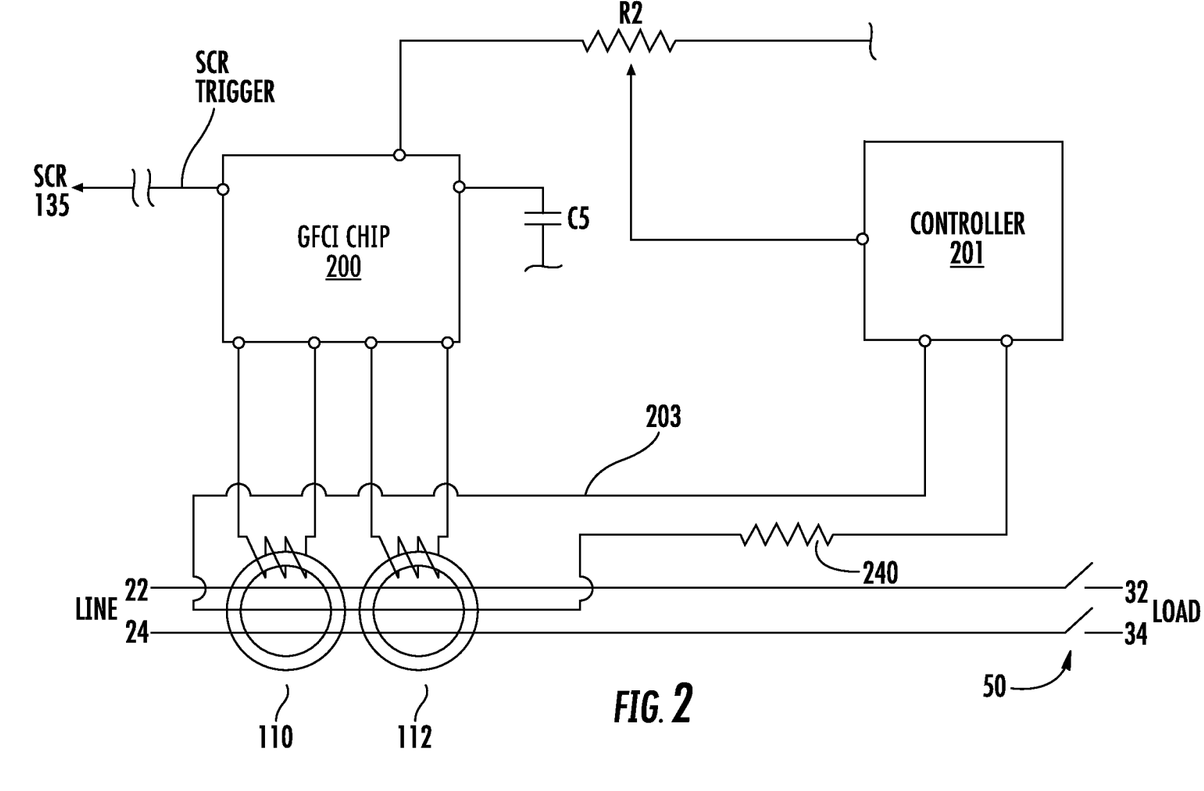
FIG. 2 is a schematic diagram of an exemplary fault current sensing and trip-time response adjusting arrangement of the exemplary circuit interrupter of FIG. 1.

Referring now to FIGS. 1 and 2, an exemplary embodiment of a GFCI including an arrangement for periodic self-calibration of the GFCI will be discussed. Although the disclosure will proceed in relation to an exemplary schematic of a GFCI, it will be appreciated that the self-calibration feature can be implemented in any of a wide variety of GFCI arrangements. In addition, the self-calibration feature can be implemented in any of a wide variety of other arrangements including but not limited to AFCI's, ELCI's, LCDI's, circuit breakers, other protective devices, and the like. Thus, the disclosure is not limited to the specific arrangement of components shown in FIGS. 1 and 2.

In the illustrated embodiment, fault detection components include a GFCI chip 200 which can be an integrated circuit or any other suitable microchip or microprocessor. An example of a suitable GFCI chip 200 is the National Semiconductor (now Texas Instruments) LM1851 Ground Fault Interrupter chip. The GFCI 1 includes line input connections 20 comprising a phase input 22, and a neutral input 24. A load side may have load output connections 30, including phase load connection 32, and neutral load connection 34. A face output connection 40 includes face phase connection 42 and face neutral connection 44 which may be configured to receive prongs for a plug. Disposed electrically between these input and output connections are a plurality of contacts 50 selectively electrically connect or isolate two electrical paths in a similar manner as a Double Pole, Single Throw (DPST) switch. That is, the two electrical paths are respectively opened and closed but they are not electrically connected together. More specifically, when closed, some of contacts 50 electrically connect phase input 22, phase load connection 32, and face phase connection 42 together. In addition, when closed, other of contacts 50 electrically connect neutral input 24, neutral load connection 34, and face neutral connection 44 together.

The GFCI 1 may include both a fault detection component in the form of the GFCI chip 200, and a line monitoring circuit including at least one fault sensor. The fault sensor in the non-limiting exemplary embodiment includes a differential transformer 110 and a grounded/neutral transformer 112.

The line monitoring circuit may include a differential transformer 110 coupled to an input circuit 111, which may include a zener diode Z1, capacitors C6, C7, and C8, and with resistor R3. These components can provide fault signal filtering and conditioning for the inputs into pins 2 and 3 of the GFCI chip 200. Ground/neutral transformer 112 can be coupled to a circuit 113 which includes capacitors C3 and C9 in a known manner.

A power circuit 122 for GFCI chip 200 is preferably formed by diode D1, along with resistors R1, R5, R6, capacitor C4, and bridge rectifier 120. Bridge rectifier 120 further includes diodes D2, D3, D4, and D5. These components may be the power supply for the GFCI chip 200, which is input into pin 8 of the GFCI chip.

In one embodiment, the GFCI 1 includes an indicator LED LD1 coupled across the phase and neutral load connections 32, 34 on the load side which indicates whether there is power to the load side (e.g. contacts 50 are closed). Indicator LED LD1 is coupled along an indicator circuit which includes any components needed to provide indication such as diode D10 and/or resistor R20. The GFCI may optionally include protection components such as capacitor C1, and metal oxide varistors MV1 and MV2. These components can protect the GFCI against high voltage power line spikes.

Under both test and non-test conditions, the output of differential transformer 110 is applied between pins 2 and 3 of the GFCI chip 200 and creates a charging current through timing capacitor C5 connected to pin 7 of the GFCI chip 200. As will be appreciated, the level of the charging current flowing from pin 7 is directly related to the level of the fault that is input into pins 2 and 3 of the GFCI chip 200. Therefore, the higher the fault input current into pins 2 and 3, the higher the output charging current from pin 7, and the faster the charging of timing capacitor C5.

During charging, the voltage on timing capacitor C5 increases, and when a threshold value is reached, pin 1 on the GFCI chip 200 goes high, triggering of silicon controlled rectifier (SCR) 135. The triggering of SCR 135 provides current to the trip solenoid 130, triggering the opening of the contacts 50 and removing the external fault from the line.

Once contacts 50 have opened, timing capacitor C5 charging current dissipates and the timing capacitor is discharged by a current flowing through discharge resistor R2. After the voltage on timing capacitor C5 goes below a predetermined voltage level, pin 1 on the GFCI chip 200 returns to a low level. In some embodiments, to shorten the time period required to discharge timing capacitor C5, additional circuitry including timing circuit 150 can be coupled to capacitor C5 which reduces this discharge time.

Pins 4 and 5 of the GFCI chip 200 are coupled to ground/neutral transformer 112, while pin 6 is coupled to the discharge resistor R2 and pin 8 is for receiving power input into the GFCI controller.

In addition, in one embodiment, a microcontroller 201 can be used to implement a self-test on the GFCI 1. The purpose of a self-test is to implement automatic periodic checks of the components of the GFCI 1 and in the event of a failed self-test, to trigger the solenoid, disconnecting power, and/or indicate the fault states. The microcontroller 201 can be any suitable type microcontroller known in the art, such as a suitable PICO microcontroller manufactured by Microchip Technology Inc. or any other microcontroller from any other suitable manufacturer.

Microcontroller 201 may be powered by power supply circuitry including resistors R11, R17, capacitor C11 and C12, and zener diode Z2 which supply power to pins 1 and 8. Alternatively, the power circuit 122 for GFCI chip 200 can also supply power to microcontroller 201. Pin 2 of microcontroller 201 is coupled to the gate of SCR 135 to control whether SCR 135 triggers. In some embodiments pin 2 is used to prevent the GFCI chip 200 from triggering the SCR 135 during a self-test sequence. Microcontroller 201 is programmed to control three states of pin 2. The first state is a high impedance state which allows the GFCI chip 200 to control SCR 135. The second state is a low output state which shunts the gate of SCR 135 to ground which effectively disables SCR 135. The second state can also be referred to as blocking, hindering, or shorting SCR 135, either wholly or partially. This state can be used during a self-test to prevent contacts 50 from opening (e.g. unlatching). The third state is an output high state which allows the GFCI controller 200 to trigger SCR 135. This third state can be used to trip the contacts 50 at some time period after a failure event such as at some time period after a failed self-test.

In one embodiment, pin 3 of microcontroller 201 is coupled to a reset button 170 so that during a manual test, microcontroller 201 initiates a test sequence similar to the automatic periodic test sequence that microcontroller 201 normally creates.

Referring now to FIG. 2, an exemplary voltage sensing and self-calibrating arrangement for the GFCI 1 is shown. As can be seen, the GFCI chip 200 is coupled to the differential transformer 110 and ground/neutral transformer 112 to receive fault inputs therefrom, in the manner previously described. The microcontroller 201 also includes a line 203 coupled through the differential transformer 110 and ground/neutral transformer 112 to enable the microcontroller to sense the fault current through resistor R240. Since the resistance of R240 is known, the current flowing through line 203 is a known or set value. When current flows through line 203, it is sensed by differential transformer 110 and ground/neutral transformer as fault current. The microcontroller 201 further is arranged to adjust the resistance of resistor R2 depending upon the sensed fault current. In one non-limiting exemplary embodiment, an output of the microcontroller 201 can turn a servo to adjust a potentiometer to achieve a desired resistance of resistor R2. As will be appreciated, by adjusting the resistance of resistor R2, the rate at which the timing capacitor C5 is charged can be adjusted. By adjusting the rate at which the timing capacitor C5 charges, the trip-time response of the GFCI 1 can be adjusted to ensure that the SCR 135 causes the contacts 50 to open within a desired time after a fault current is sensed.

Fault current passing through the current transformers 110, 112 can be a set value based on a known resistance of R240. As previously noted, because the resistance of R240 is known, the current flowing through line 203 is a known or set value. When current flows through line 203, it is sensed by differential transformer 110 and ground/neutral transformer as fault current. Since the expected fault current can be known, the microcontroller can sense the fault current, compare it to one or more predetermined values, and can then adjust the rate at which the timing capacitor C5 is charged to ensure that the timing capacitor is fully charged within a required tolerance. In one embodiment the controller 201 can increase the resistance of resistor R2 to increase the rate at which the timing capacitor C5 charged, thereby decreasing the trip time response of the GFCI 1. By contrast, the controller can decrease the resistance of resistor R2 to decrease the rate at which the timing capacitor C5 is charged, thereby increasing the trip time response of the GFCI 1. By adjusting this charging rate, the time in which it takes to trigger the SCR 135 can be adjusted, thus adjusting the time in which it takes to open the contacts 50 after a particular fault current is sensed.

In one non-limiting exemplary embodiment, the microcontroller 201 can compare the sensed values of fault current and can compare them to one or more predetermined values stored in memory (not shown) associated with the microcontroller to determine by how much, if any, the resistance of resistor R2 should be adjusted in order to adjust the trip-time response of the GFCI 1. In some embodiments, a look up table containing a plurality of predetermined adjustment values can be used. For example, the microcontroller 201 can sense a fault current and can compare that fault current to a plurality of predetermined values stored in the memory. By matching the sensed fault current to at least one of the predetermined stored values, a predetermined adjustment to resistor R2 can be read from the memory.

In this manner the GFCI 1 can periodically and automatically self-calibrate, thereby minimizing or eliminating the voltage, load, and/or temperature shifts of trip-time response that may exceed the required trip range of the GFCI. The microcontroller 201 can be programmed to execute this self-calibration routine at a desired periodic basis. In one non-limiting exemplary embodiment, the period between self-calibration routines may be one minute. It will be appreciated that any appropriate period can be used, including variable periods. For example, it may be desirable to perform more frequent self-calibrations during times in which temperatures are rapidly changing, such as morning or evening. In some embodiments the microcontroller 201 may sense time of day based on a predetermined cycle count. In alternative embodiments the microcontroller may receive an input signal representative of time from an external source. In addition, the period may be user selectable.

Although the self-calibration feature has been described as being automatically implemented on a periodic basis, it will be appreciated that the GFCI 1 can alternatively (or in addition to) be configured to self-calibrate each time the reset button 170 is pressed. The reset button 170 (FIG. 1) can send a signal to the microcontroller 201 which could initiate the self-calibration cycle.

Figure 3:
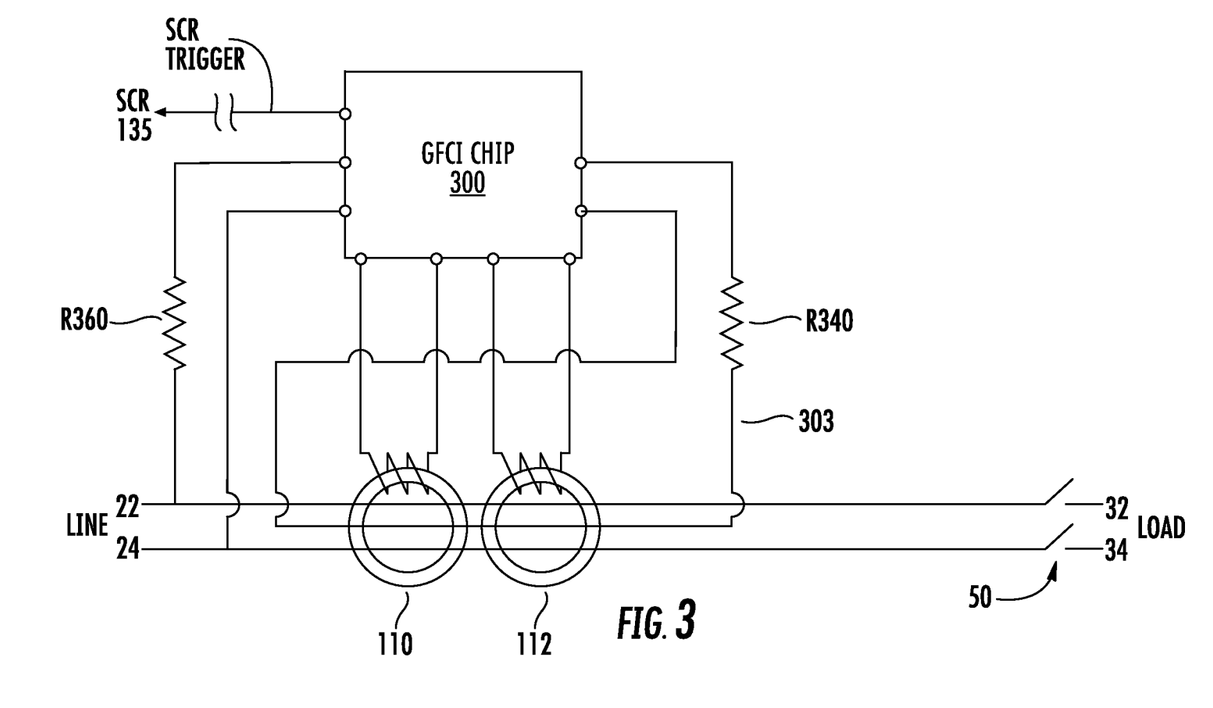
FIG. 3 is a schematic diagram of a further exemplary fault current sensing and trip-time response adjusting arrangement of the exemplary circuit interrupter of FIG. 1.

Referring now to FIG. 3, another embodiment is shown which is similar to FIG. 1 except that a single chip/controller 300 is used in place of the GFCI chip 200 and microcontroller 201 of FIG. 1. The inputs of the GFCI chip 300 can be used to measure fault current via a line 303 through the differential transformer 110 and ground/neutral transformer 112. Thus, with this embodiment a single chip/controller can be used to self-calibrate the GFCI trip time response as opposed to the prior embodiment in which a separate GFCI chip and microcontroller are used. Similar to the prior embodiment, the GFCI chip 300 can include connections to the differential transformer 110 and ground/neutral transformer 112 and line 303 can include a resistor R340 having a predetermined resistance. The GFCI chip 300 also takes input from the phase input 22 and neutral input 24. In some embodiments a resistor R360 may be provided in the line between the phase input 22 and the GFCI chip 300 to determine input voltage.

Using this sensed information regarding fault current, the GFCI chip 300 can automatically actuate the SCR 135 to trigger the opening of contacts 50 within a desired trip time. Thus, in contrast to the arrangement in the embodiment shown in FIG. 2, the FIG. 3 embodiment does not include a timing capacitor or a variable resister.

In some embodiments, predetermined adjustments may be stored in memory (not shown) associated with the GFCI 300. These predetermined adjustment values can be correlated to sensed fault current values, depending upon on how far the sensed values deviate from a predetermined value or range.

Figure 4:
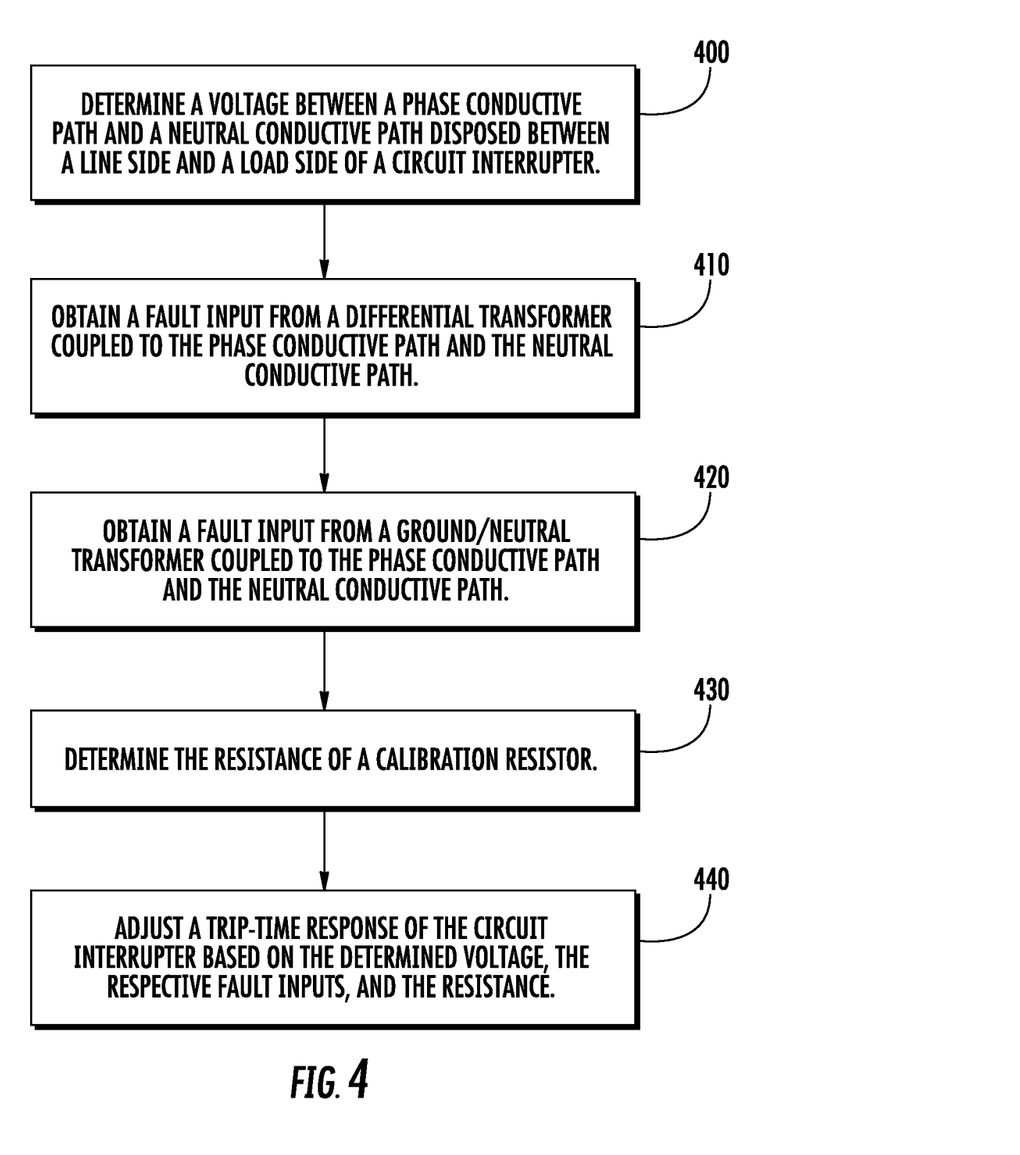
FIG. 4 is a flow chart illustrating an exemplary method of operating a circuit interrupter according to the disclosure.

An exemplary method for self-calibration of a GFCI will now be described in relation to FIG. 4. It will be appreciated that although the steps of the method will be described in sequence, various steps of the method can be performed in any order, including simultaneously, without departing from the disclosure.

At step 400, a voltage is determined between a phase conductive path and a neutral conductive path disposed between a line side and a load side of a circuit interrupter. At step 410, a fault input is obtained from a differential transformer coupled to the phase conductive path and the neutral conductive path. At step 420, a fault input is obtained from a ground/neutral transformer coupled to the phase conductive path and the neutral conductive path. At step 430, a resistance of a calibration resistor is determined. At step 440, a trip-time response of the circuit interrupter is adjusted based on the determined voltage, the respective fault inputs, and the resistance.

In some embodiments, the calibration resistor is a variable resistor, and adjusting a trip-time response of the current interrupter includes adjusting the resistance of the variable resistor. In other embodiments, adjusting a trip-time response of said current interrupter maintains the trip-time response within a predetermined range.

In some embodiments a timing capacitor may be coupled to an SCR and a voltage source for charging the timing capacitor, and the step of adjusting a trip-time response includes adjusting a rate at which the timing capacitor is charged by the voltage source. Further, adjusting the rate at which the timing capacitor is charged may comprise adjusting the resistance value of the variable resistor.

In some embodiments the step of adjusting a trip-time response comprises comparing at least one of the determined voltage, the respective fault inputs, and the resistance to respective predetermined values. The resistance value of the calibration resistor may be adjusted based on one or more of the aforementioned comparisons. The self-calibration method can be performed on a predetermined periodic basis, or it can be performed with a reset button of the current interrupter is actuated.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. By way of example, such a machine may include, but not limited to, any suitable processing platform, computing platform, computing device, processing device, computing system, processing system, computer, processor, or the like, and may be implemented using any suitable combination of hardware and/or software. The computer-readable medium or article may include, but not limited to, any suitable type of memory unit, memory device, memory article, memory medium, storage device, storage article, storage medium and/or storage unit, for example, memory (including, but not limited to, non-transitory memory), removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

The invention claimed is:

1. A circuit interrupter, comprising:
   a phase conductive path and a neutral conductive path disposed between a line side and a load side of said circuit interrupter;
   a differential transformer coupled to said phase conductive path and said neutral conductive path;
   a ground/neutral transformer coupled to said phase conductive path and said neutral conductive path;
   a circuit interrupter chip electrically coupled to respective fault inputs from the differential transformer and the ground/neutral transformer;
   a controller electrically coupled to the circuit interrupter chip, the controller further including an electrical sensing line disposed through the differential transformer and the ground/neutral transformer, the controller coupled to a variable resistor, where a resistance value of the variable resistor is controllable by said controller; and
   an interrupter circuit coupled to the controller for opening at least one of the phase conductive path and the neutral conductive path when a predetermined ground fault current condition is sensed by the circuit interrupter chip;
   wherein the controller is programmed to adjust the resistance value of the variable resistor based on a sensed value of said predetermined ground fault current condition from said electrical sensing line, wherein the adjusted resistance value adjusts a fault current interrupter trip-time response of the circuit interrupter to maintain the fault current interrupter trip-time response within a predetermined range.

2. The circuit interrupter of claim 1, wherein the interrupter circuit is a silicon controlled rectifier (SCR) coupled to selectively interrupt the respective phase conductive path and the neutral conductive path.

3. The circuit interrupter of claim 1, further comprising a timing capacitor coupled to the interrupter circuit, the timing capacitor coupled to a voltage source for charging the timing capacitor at a rate that depends, at least in part, on the resistance value of the variable resistor.

4. The circuit interrupter of claim 1, wherein the controller is programmed to compare sensed values of at least one member of the group of: voltage between the phase and neutral conductive paths, the respective fault inputs from the differential transformer and the ground/neutral transformer, or the resistance value of the variable resistor, to predetermined values.

5. The circuit interrupter of claim 4, wherein the controller is configured to adjust the resistance value of the variable resistor based on the comparison of the sensed values to the predetermined values.

6. The circuit interrupter of claim 1, wherein the controller is programmed to adjust the resistance value of the variable resistor on a predetermined periodic basis.

7. The circuit interrupter of claim 1, wherein the circuit interrupter is a ground fault circuit interrupter.

8. A circuit interrupter, comprising:
   a phase conductive path and a neutral conductive path disposed between a line side and a load side of said circuit interrupter;
   a differential transformer and a ground/neutral transformer, each coupled to said phase conductive path and said neutral conductive path;
   a circuit interrupter chip electrically coupled to respective fault inputs from the differential transformer and the ground/neutral transformer, the circuit interrupter chip further being electrically coupled to an electrical sensing line disposed through the differential transformer and the ground/neutral transformer;
   wherein the circuit interrupter chip is programmed to adjust a fault current interrupter trip-time response based on a sensed value of a ground fault current condition from said electrical sensing line to maintain the fault current interrupter trip-time response within a predetermined range.

9. The circuit interrupter of claim 8, the circuit interrupter chip further being electrically connected to a silicon controlled rectifier (SCR), the SCR coupled to respective contacts in the phase conductive path and the neutral conductive path, the SCR operable to selectively open a set of contacts in response to a command from the circuit interrupter chip.

10. The circuit interrupter of claim 8, wherein the circuit interrupter chip is programmed to adjust the fault current interrupter trip-time response automatically on a periodic basis.

11. The circuit interrupter of claim 8, wherein the circuit interrupter chip is programmed to adjust the fault current interrupter trip-time response upon an actuation of a reset button of the circuit interrupter.

12. A method for self-calibration of a circuit interrupter, comprising:
   obtaining a voltage between a phase conductive path and a neutral conductive path, the phase conductive path and the neutral conductive path being disposed between a line side and a load side of said circuit interrupter;
   obtaining a differential fault input from a differential transformer coupled to said phase conductive path and said neutral conductive path;
   obtaining a ground/neutral fault input from a ground/neutral transformer coupled to said phase conductive path and said neutral conductive path;
   determining a desired value for a resistance of a calibration resistor based on the determined voltage and the respective fault inputs; and
   wherein a trip-time response of said circuit interrupter is adjusted by setting the resistance value of the calibration resistor to the determined value.

13. The method of claim 12, wherein adjusting the trip-time response of said circuit interrupter maintains the trip-time response of said circuit interrupter within a predetermined range.

14. The method of claim 12, further comprising a timing capacitor coupled to an interrupter circuit, the timing capacitor coupled to a voltage source for charging the timing capacitor, wherein adjusting the trip-time response of said circuit interrupter comprises adjusting a rate at which the timing capacitor is charged by the voltage source.

15. The method of claim 14, wherein adjusting the rate at which the timing capacitor is charged comprises adjusting the resistance value of the calibration resistor.

16. The method of claim 12, wherein adjusting the trip-time response of said circuit interrupter comprises comparing at least one of said voltage, said differential fault input, said ground/neutral fault input and said determined resistance value to respective predetermined values.

17. The method of claim 16, further comprising adjusting the resistance value of the calibration resistor based on said comparison.

18. The method of claim 12, further comprising performing the method for self-calibration of a circuit interrupter on a predetermined periodic basis.

19. The method of claim 12, further comprising performing the method for self-calibration of a circuit interrupter when a reset button of the circuit interrupter is actuated.

* * * * *